E. G. CLARK.
MACHINE FOR MAKING STENCILS.
APPLICATION FILED MAY 16, 1910.
983,873.
Patented Feb. 14, 1911.
4 SHEETS—SHEET 2.
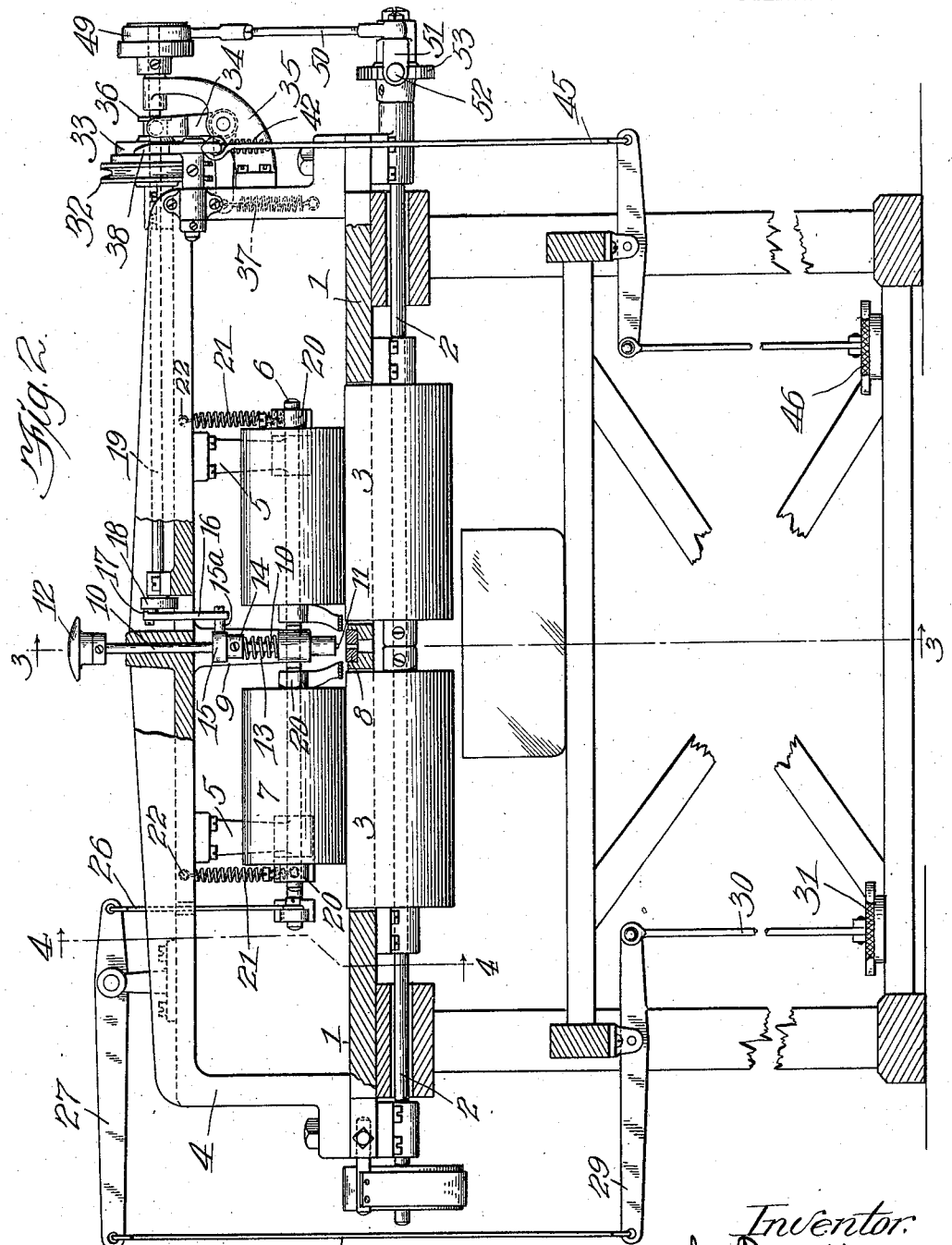

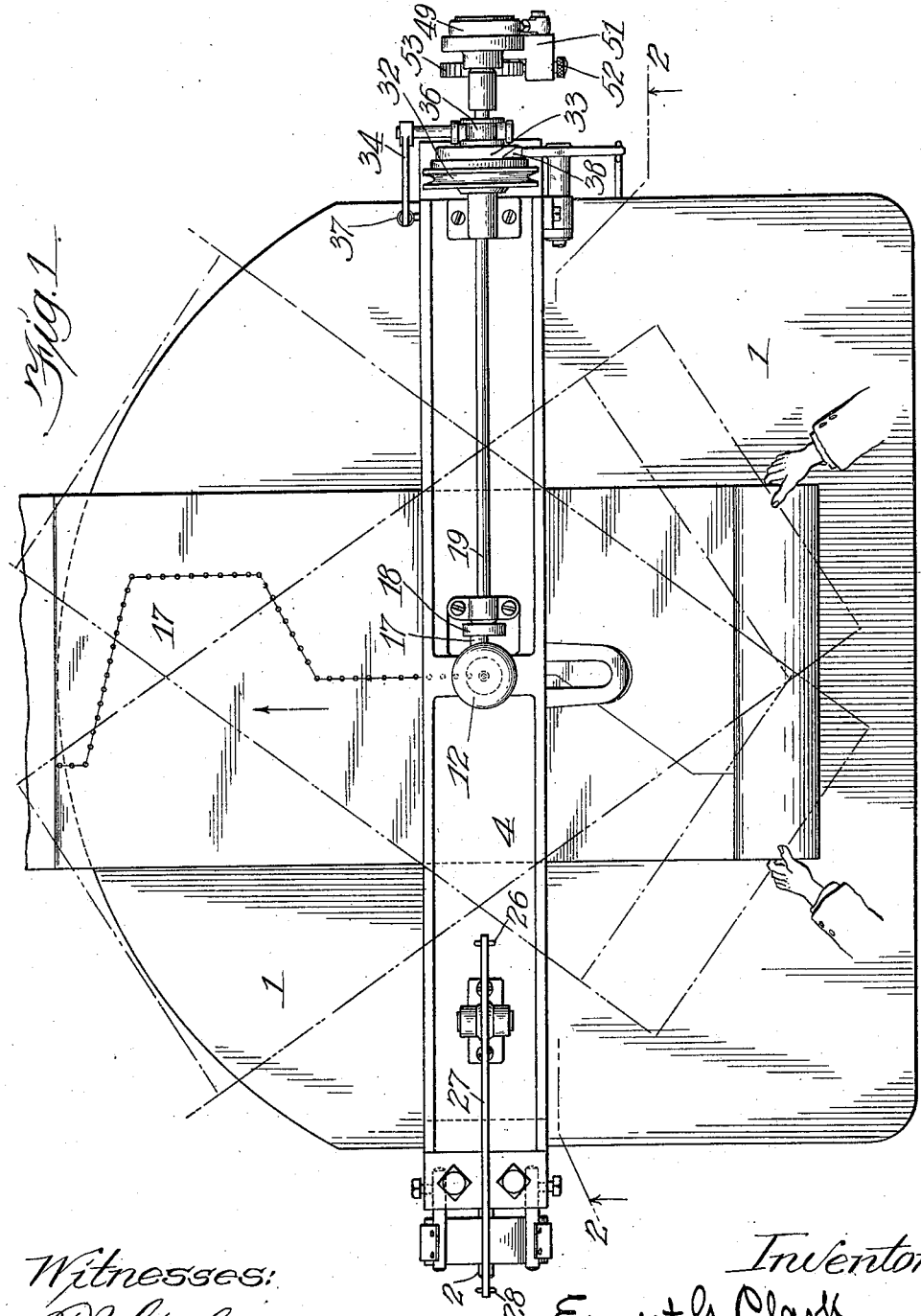

E. G. CLARK.
MACHINE FOR MAKING STENCILS.
APPLICATION FILED MAY 16, 1910.
983,873.
Patented Feb. 14, 1911.
4 SHEETS—SHEET 3.
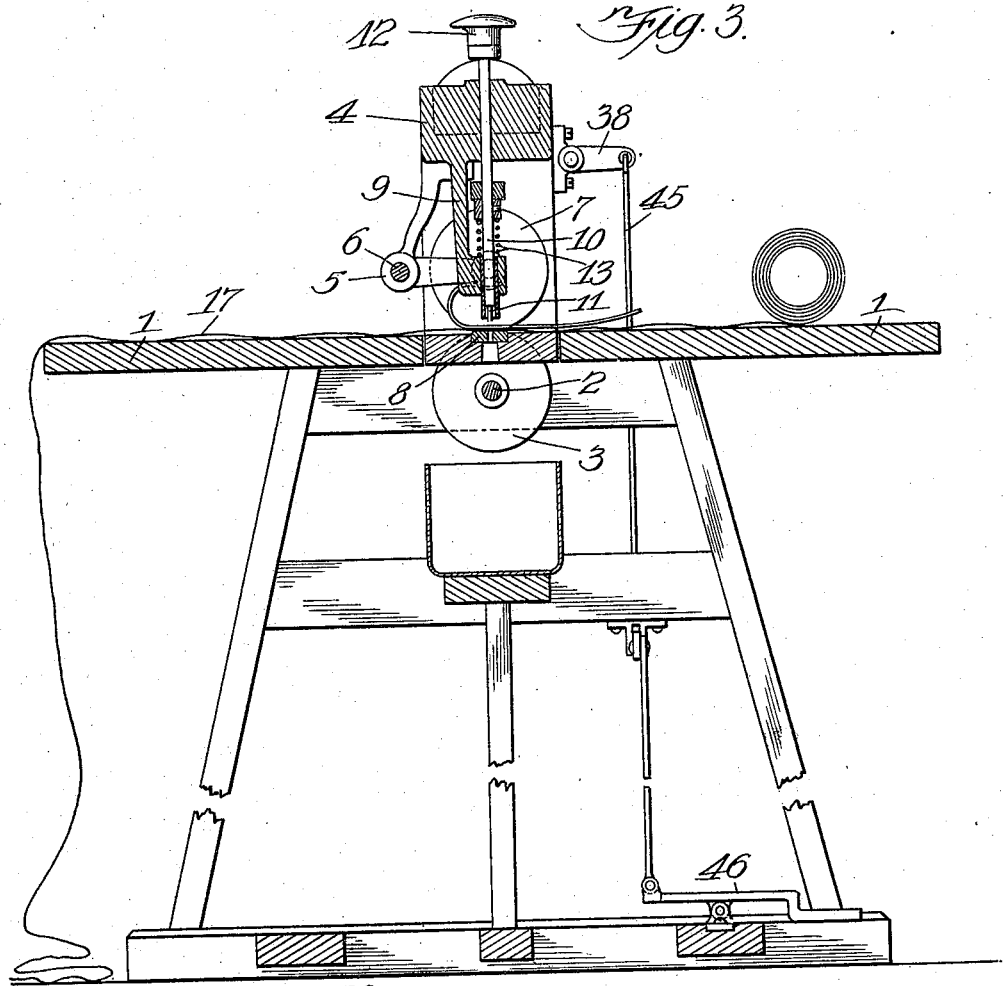
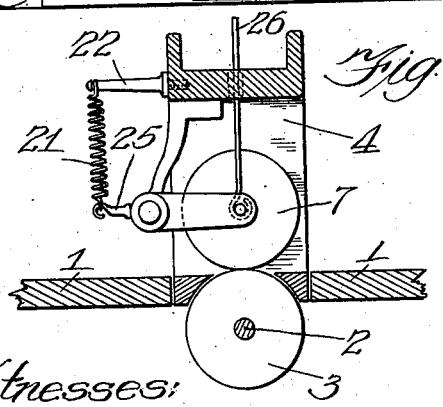
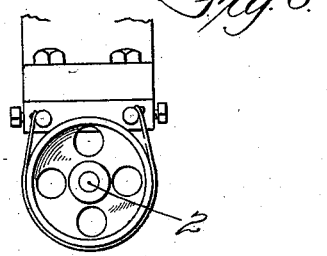
Witnesses:
P. J. Gathmann
C. J. Christoffel
Inventor.
Ernest G. Clark
By Burton & Burton
His Attorneys:

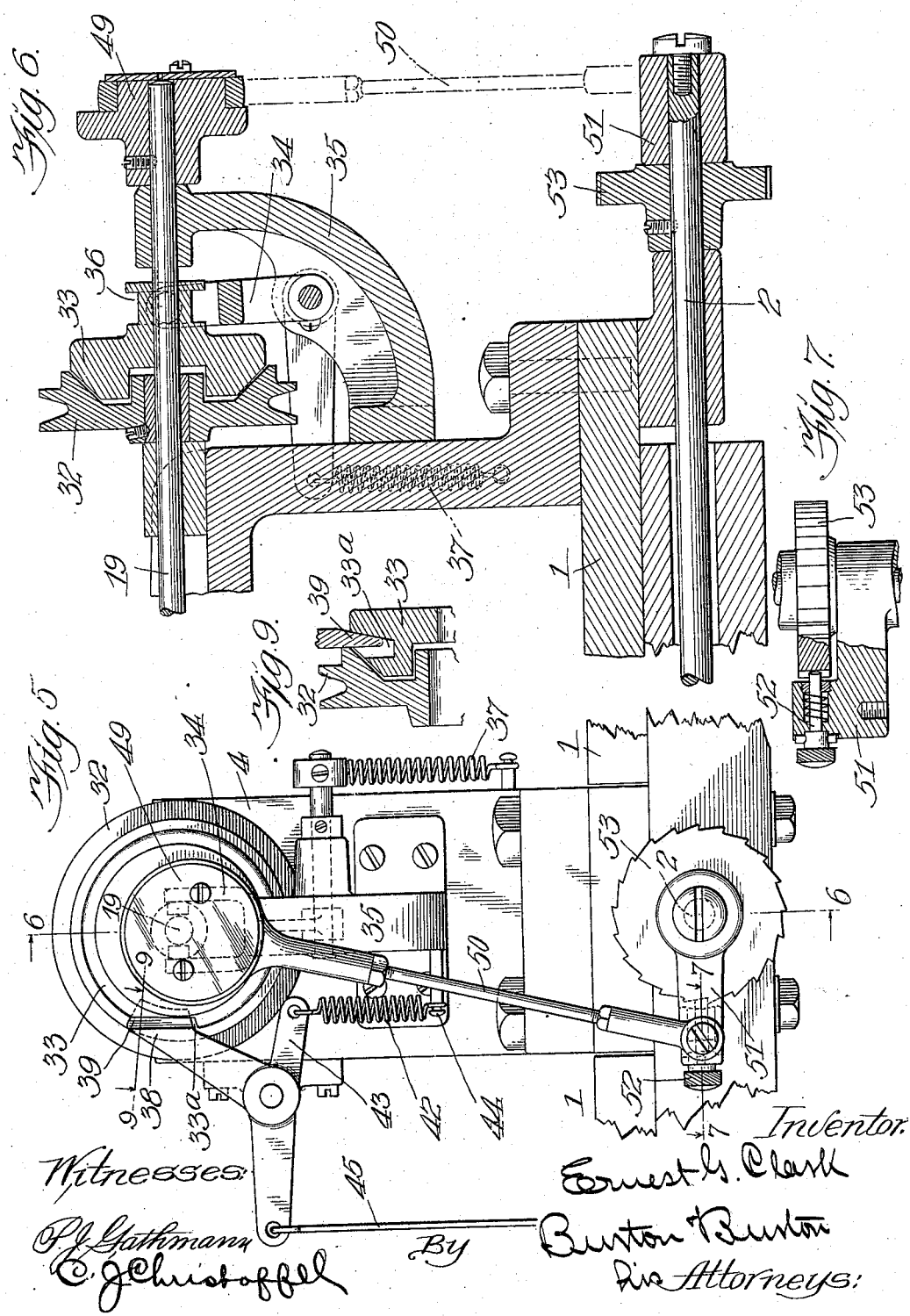

UNITED STATES PATENT OFFICE.

ERNEST G. CLARK, OF DE KALB, ILLINOIS.

MACHINE FOR MAKING STENCILS.

983,873.  Specification of Letters Patent.  Patented Feb. 14, 1911.

Application filed May 16, 1910. Serial No. 561,731.

*To all whom it may concern:*

Be it known that I, ERNEST G. CLARK, a citizen of the United States, residing at De Kalb, in the county of Dekalb and State of Illinois, have invented new and useful Improvements in Machines for Making Stencils, of which the following is a specification, reference being had to the accompanying drawings, forming a part thereof.

The purpose of this invention is to provide a machine adapted for making a stencil for applying to perforated music sheets or rolls, the zigzag or otherwise irregular dotted lines which are customarily marked upon such perforated music sheets or rolls, to indicate variations in the playing.

It consists in the elements and features of construction and their combinations shown and described as indicated in the claims.

In the drawings: Figure 1 is a plan view of a machine embodying this invention. Fig. 2 is a partly sectional front elevation of the same, section being made in vertical plane transversely of the table and portions of the frame-work at the line 2—2 on Fig. 1. Fig. 3 is a vertical section at the line 3—3 on Fig. 2. Fig. 4 is a section at the line 4—4 on Fig. 2. Fig. 5 is a detail end elevation of the roll-operating and clutch devices on a larger scale than on Fig. 2. Fig. 6 is a section at the line 6—6 on Fig. 5. Fig. 7 is a detail partly sectional plan view of the roll-operating ratchet, section being made at the line 7—7 on Fig. 5. Fig. 8 is a detail elevation of a brake device. Fig. 9 is a detail sectional view of the clutch devices on line 9—9 of Fig. 5.

The machine shown in the drawings comprises a table, 1, upon the under side of which there is journaled a shaft, 2, on which there are mounted for rotation with the shaft, paper-feeding rolls, 3, 3, which protrude up through the table so that their upper sides are very slightly above the upper surface of the table, though very nearly flush therewith. Upon the upper side of the table, 1, there is mounted an arch, 4, and in hangers 5, 5, depending from the arch, there is journaled a shaft, 6, upon which are mounted for rotation therewith, or thereon, pressure rolls, 7, 7, which directly overhang the rolls, 3, 3, respectively, and are adapted to coöperate therewith for feeding the paper which may be passed between them when the rolls, 7, 7, are thus depressed into contact with said rolls, 3, 3. Means for operating the rolls, 7, for raising and lowering them, are hereinafter described.

In the table, 1, between the rolls, 3, 3, there is mounted a die, 8, and in a hanger, 9, which depends from the arch, 4, between the rolls, 7, 7, there is mounted a reciprocating plunger, 10, which at its lower end carries a punch, 11, for coöperation with the die, 8. The plunger, 10 extends up through the arch, 4, and at its upper end is provided with an operating knob, 12. A spring, 13, coiled about the plunger above the bearing of the latter in the hanger, 9, is stopped at its upper end against a stop-collar, 14, on the plunger, and thereby operates to yieldingly uphold the plunger. A collar, 15, loose on the plunger, 10, above the fixed collar, 14, has a laterally projecting stem, 15ª, which is connected with the lower end of a pitman, 16, whose upper end is connected to a crank wrist, 17, on a crank wheel, 18, mounted upon the end of a rotating shaft, 19, journaled in the arch and provided at the opposite end from the crank wheel, 18, with operating connections hereinafter described. It will be seen that while the plunger, 10, can be depressed at will by a stroke upon the knob at the top, being returned by the spring, 13, said plunger also is adapted to be operated by the rotation of the shaft, 19, through the pitman, 16, and loose collar, 15, which will depress the plunger when the rotation of the crank wrist thrusts said loose collar downward, the plunger being retracted or thrust upward by its spring, 13, when the revolution of the shaft, 19, causes the pitman, 16, to be withdrawn upward, drawing the loose collar, 15.

The paper which is to be operated upon to form the stencil for the making of which the machine is designed, is represented at 17, it being shown as a roll to be held by the operator and indicated in said Fig. 1, at the forward side of the arch, the paper being entered between the rolls and then moved rearward past the punch. The line along which the stencil perforations are to be made is previously laid out upon the paper, and the operator's sole duty is to keep the paper positioned so that the line indicated for the stencil perforations shall travel directly under the punch. For this purpose it is only necessary that the operator should turn the paper at the angles of the zigzag course indicated by the lines, so as to set the next straight element of the course following the angle in the direction of feed, that is in a vertical plane directly at right angles to the feed rolls. For this purpose it is necessary that the operator should be able first to depress the punch and leave it depressed while the pressure rolls are lifted so that the paper can be turned about the punch as a pivot at the angle in the indicated course, and depress the pressure rolls and set the rolls in feeding operation so as to advance the paper along the new course to the next angle, when the operation is repeated. To enable the operator to thus control the machine and its movements, the mechanism for raising and lowering the pressure rolls and for engaging and disengaging the roll-operating and the punch-operating mechanisms, is provided as now will be described.

For operating the pressure rolls, 7, they are journaled in lever arms, 20, 20, which are pivoted to the lower ends of the hangers, 5, and in addition to their weight which causes them to descend and rest upon the rolls, 3, there are provided springs 21, connected at their upper ends to studs, 22, projecting off rearward from the arch, 4, and at the lower ends to studs, 25, projecting off rearward from the fulcrums of the arms, 20, such springs acting by contraction and tending to yieldingly bring the lever arms, 20, down at their ends in which the rolls, 7, are journaled. For lifting the rolls, 7, to release the paper, there is provided a rod, 26, which engages the shaft, 6, extends up through the arch, 4, and at its upper end is connected to one end of a lever, 27, the opposite end of which is connected by a link, 28, to a lever, 29, fulcrumed under the table, and connected by a link, 30, to a pedal, 31, in convenient position to be reached by the foot of the operator while seated at the table for guiding the paper. The depression of the pedal at the forward end thrusting it up at the rear end operates to lift the roll, 7, off the rolls, 3.

A pulley, 32, mounted loose on the shaft, 19, is connected thereto by a clutch of which the movable member, 33, is operated by a bell crank lever, 34, fulcrumed on a bracket, 35, which is mounted upon the right hand end of the arch, 4, one arm of the bell crank lever being a shipping fork engaged with the grooved hub, 36, of the clutch member, 33, the other arm being connected with a spring, 37, whose opposite end is attached to the standard of the arch, 4, and re-acts by contraction to rock the bell crank lever in direction for engaging the clutch. The clutch member, 33, has a notch, 33ª, the end of which is exposed at the side of the loose pulley, 32; and on the forward side of the standard of the arch, 4, there is fulcrumed a lever, 38, one arm of which terminates in a wedge, 39, which enters the notch, 33ª, for crowding the clutch member, 33, off from its engagement with the pulley, 32, and at the same time engaging and holding said clutch member, 33, stopping its rotation instantly as soon as the wedge end of the lever enters the notch. A spring, 42, connected with an arm, 43, of the lever, 39, and with a fixed stud, 44, on the bracket, 35, operates by contraction with a tendency to hold the lever swung into position for engagement of said wedge end with the notch, 33ª. Another arm of the lever, 44, is connected by rod, 45, with the pedal, 46, which may be depressed by the foot of the operator for rocking the lever in opposition to the spring to withdraw the wedge end from the notch.

In the operation of the devices thus far described, it will be seen that normally, that is under the action of the spring, 42, the wedge end of the lever, 39, will be bearing upon the periphery of the clutch member, 33, ready to enter the notch, 33ª, when it comes around to said wedge end of the lever, and the clutch will therefore be engaged and the punching device will be operated unless the operator by depressing the pedal 46, withdraws said wedge end of the lever, 39, from the notch, 33ª, permitting the spring, 37, to hold the clutch member, 33, in engagement with the wheel, 32. By comparison of Figs. 2 and 5, it will be seen that the position at which the said wedge end of the lever is engaged with the notch, 33ª, and the latter is held at rest, is the highest position of the punch; that is the position at which it has completed its withdrawing stroke. The stroke of the punch is necessarily vitally related to the feeding action of the paper since the paper must be at rest when the punch penetrates it, and for this purpose the paper feed action is connected as will now be described with the clutch driven shaft, 19. Upon the end of said shaft, there is mounted an eccentric, 49, from which the eccentric rod, 50, extends to the arm of a lever, 51, fulcrumed on the feed roll shaft, 2, and on said lever arm there is carried a pawl, 52, which engages a ratchet disk, 53, fast on said shaft. The rotation of the shaft, 19, by means of the eccentric gives an oscillating motion to the pawl for actuating the feed roll shaft by means of the ratchet disk; and from examination of Fig. 5, it will be seen that the engagement of the wedge end of the lever, 39, with the notch, 33ª, occurs at the end of the down stroke of the eccentric rod, which is the feeding stroke of the pawl; that is to say, the clutch is disengaged and the operation of the punch is interrupted with the punch at the limit of its upstroke and the paper at the end of the advance stroke and at the point of rest or halt. When therefore, the operator depresses the pedal, 46, for withdrawing the wedge end of the lever, 39, from the notch, 33ª, and permitting engagement of the clutch for operating the punch, the first action is the descent of the punch which occurs while the pawl is making its retracting stroke, that is while the paper is at rest. By this arrangement of the parts without any lost motion or interrupted action, the rest of the paper and the stroke of the punch are caused to be coincident as is necessary, and the feeding movement of the paper feed rolls occurs while the punch is withdrawn.

I claim:

1. In a machine for the purpose indicated, in combination with paper feeding rolls and their actuating mechanisms, a punch and means for reciprocating it; a shaft by which both said mechanisms are actuated, each of said mechanisms comprising means for converting the rotary movement of the shaft into reciprocating movement; a plunger to which such reciprocating movement is communicated for driving the punch; a pawl to which the reciprocating movement is communicated for actuating the feed rolls, and a ratchet wheel which is operated by the pawl; the two reciprocating movements being timed so that the retracting movement of the punch occurs during the feeding movement of the pawl, and the retracting movement of the pawl occurs during the descending movement of the punch.

2. In a machine for the purpose indicated, paper-feeding rolls and actuating mechanism for the same, a punch and actuating mechanism for the same, a shaft from which both said actuating mechanisms derive movement, each of said mechanisms consisting of means for converting the rotary movement of the shaft into reciprocating movement; a pawl which is thus reciprocated for actuating the feed rolls during the stroke in one direction; a plunger which is thus reciprocated for actuating the punch; a continuously rotated wheel loose on the shaft, and constituting one member of a clutch, the other member being mounted for sliding on and rotating with the shaft; means for yieldingly holding the clutch members in engagement, and a device operated at will for separating them; the clutch member which slides on the shaft being engageable for so separating them at one point only in its rotation, said point being that at which the feeding stroke of the pawl and the retracting stroke of the plunger are finished.

3. In a machine for the purpose indicated, in combination with paper feeding rolls and actuating mechanism for the same, a punch and means for reciprocating it, the roll feeding mechanism and the punch reciprocating mechanism being relatively timed to cause the feed movement to cease at the end of the retracting movement of the punch, the punch being mounted for a punching stroke independently of said mechanisms.

4. In a machine for the purpose indicated, in combination with paper-feeding rolls comprising a feed roll and a pressure roll, and means for operating the feed roll with step by step movement with rest intervals, a punch and means for reciprocating it, the punch-operating mechanism and the feed operating mechanism being relatively timed to cause the feed rolls to come to rest at the end of the retracting stroke of the punch, the punch being mounted for its operative stroke independently of the actuating mechanism, the pressure rolls being mounted for lifting away from the feed rolls, and means for so lifting them at will.

5. In a machine for the purpose indicated, in combination with feed rolls and pressure rolls coöperating therewith to feed the paper, punching mechanism and clutch driven means for actuating it, a foot-operated device for controlling the clutch, the pressure rolls being mounted for lifting away from the feed roll to release the paper, and foot-operating means for so lifting them, the punch being mounted for an operating stroke at will independently of the clutch driven actuating mechanisms.

6. In a machine for the purpose indicated, in combination with two feed rolls co-axial with each other, mounted in the table with their upper surfaces approximately flush with the upper surface of the table, a die mounted in the table between the proximate ends of such rolls and substantially in the vertical plane of their axes, a punch mounted above the table for coöperating with the die, and pressure rolls also mounted above the table for coöperating with the feed rolls having their axes in alinement and substantially in the vertical plane of the axes of the feed rolls; whereby the paper is held between the feed rolls and the pressure rolls substantially at the line at which the punching occurs.

7. In a machine for the purpose indicated, paper feeding rolls and pawl and ratchet mechanism for operating them in step-by-step movement with rest intervals, and a punch and crank mechanism for reciprocating it, a shaft from which the pawl movement and the crank movement are both derived, the eccentric elements of the shaft for communicating said movements being relatively positioned about the axis of the shaft to cause the operating stroke of the punch to occur during the retracting stroke of the pawl.

8. In a machine for the purpose indicated, paper feeding rolls and mechanism for actuating them in step-by-step-movement with rest intervals, a plunger mounted for reciprocation and a punch carried thereby, an operating crank shaft, a pitman from the crank, a collar mounted loosely on the plunger connected with the pitman, a stop on the plunger encountered by the collar for giving the punch its operating stroke; a spring to retract the plunger, the plunger being provided with means additional to the pitman operated collar for giving it an operating stroke independently of the latter.

In testimony whereof, I have set my hand in the presence of two witnesses, at De Kalb, Illinois, this sixth day of May, 1910.

ERNEST G. CLARK.

Witnesses:
A. B. HENBEY,
H. L. QUICK.